July 25, 1961
J. D. LINCOLN
2,993,525
HONEYCOMB FABRICATING MACHINE
Filed Oct. 28, 1957
16 Sheets-Sheet 1
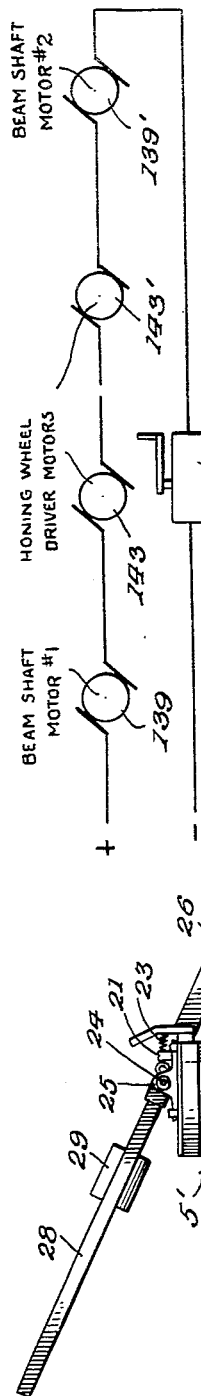
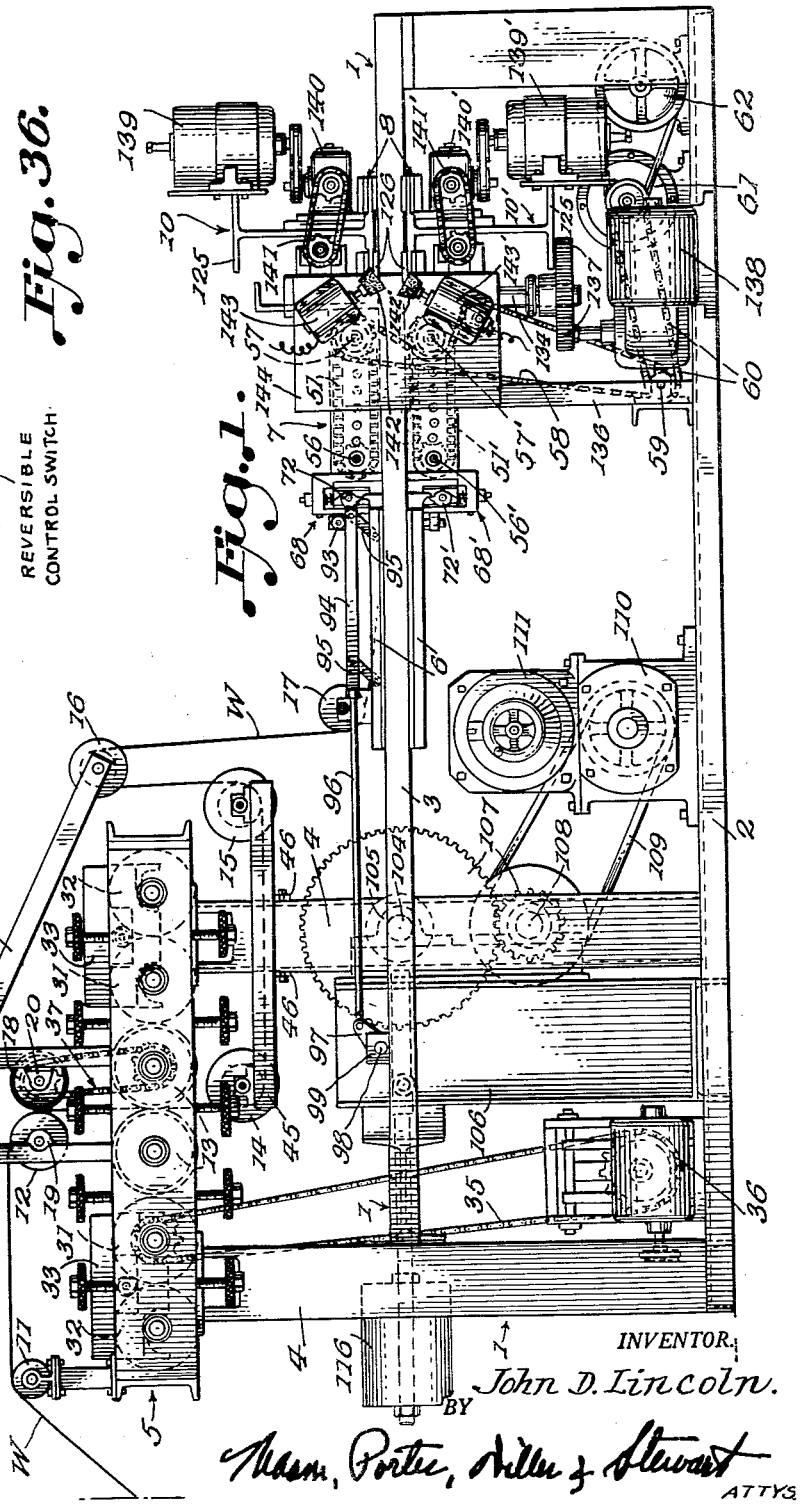
INVENTOR.
John D. Lincoln.
BY
Mason, Porter, Diller & Stewart
ATTYS.

July 25, 1961
J. D. LINCOLN
2,993,525
HONEYCOMB FABRICATING MACHINE
Filed Oct. 28, 1957
16 Sheets-Sheet 2
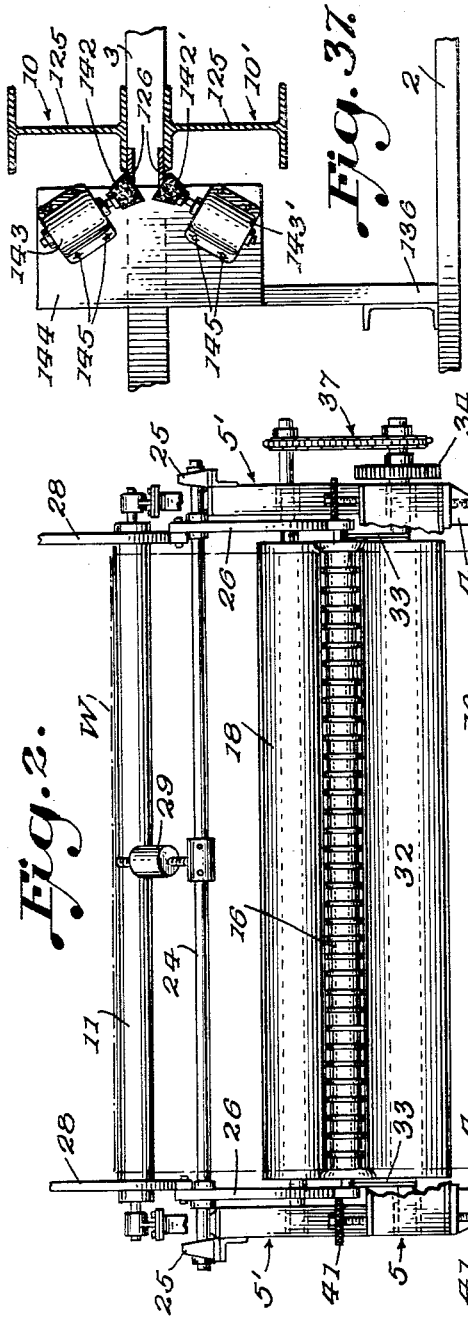
INVENTOR:
John D. Lincoln.
BY
ATTYS.

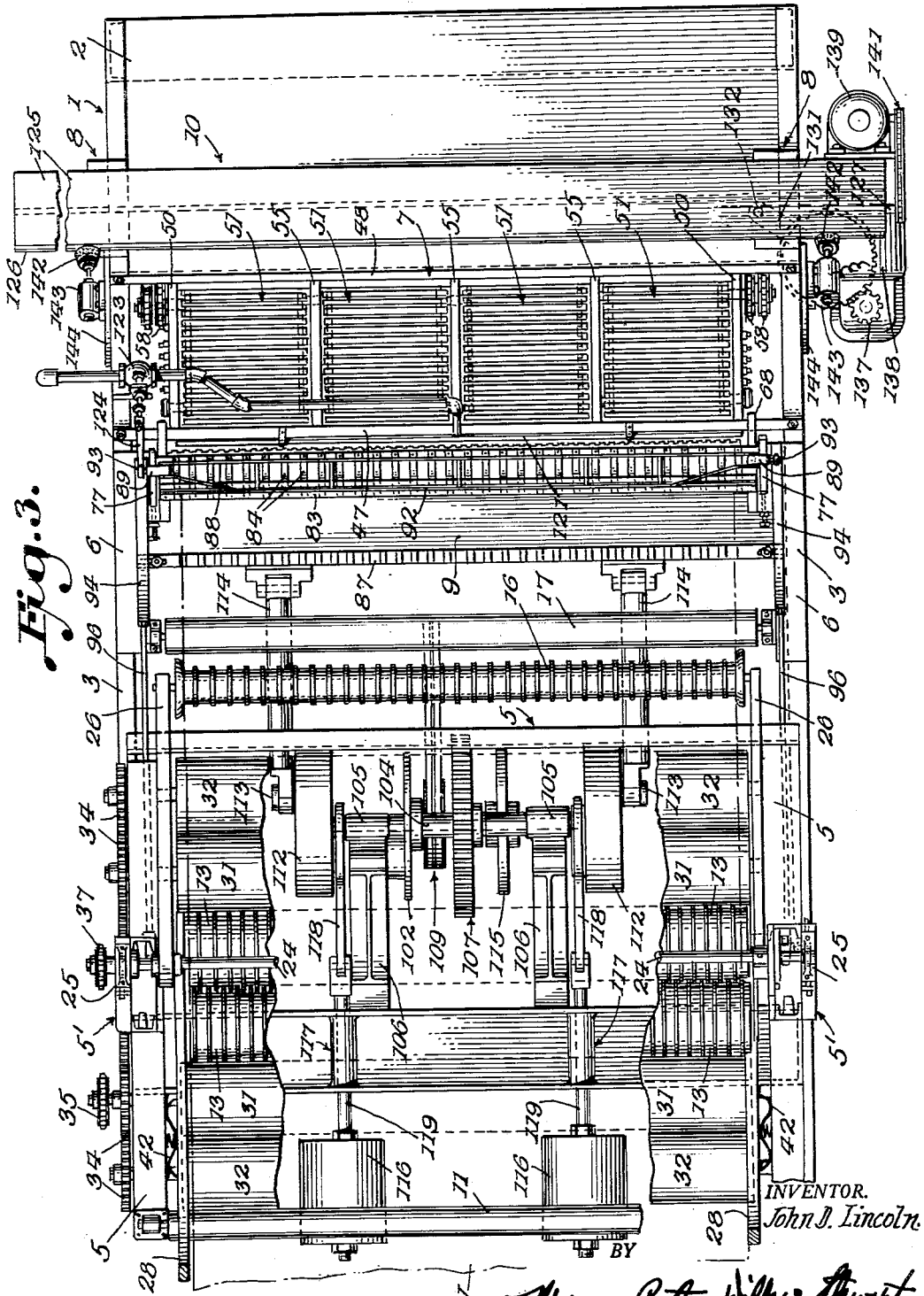

INVENTOR.
John D. Lincoln.
BY
Mason, Porter, Diller & Stewart
ATTYS.

July 25, 1961    J. D. LINCOLN    2,993,525
HONEYCOMB FABRICATING MACHINE
Filed Oct. 28, 1957    16 Sheets-Sheet 5
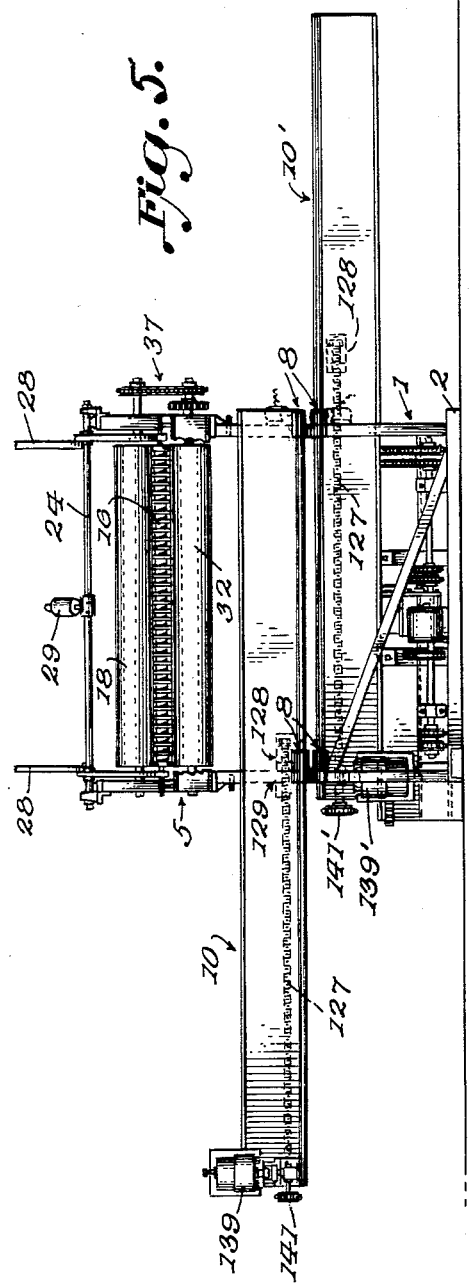
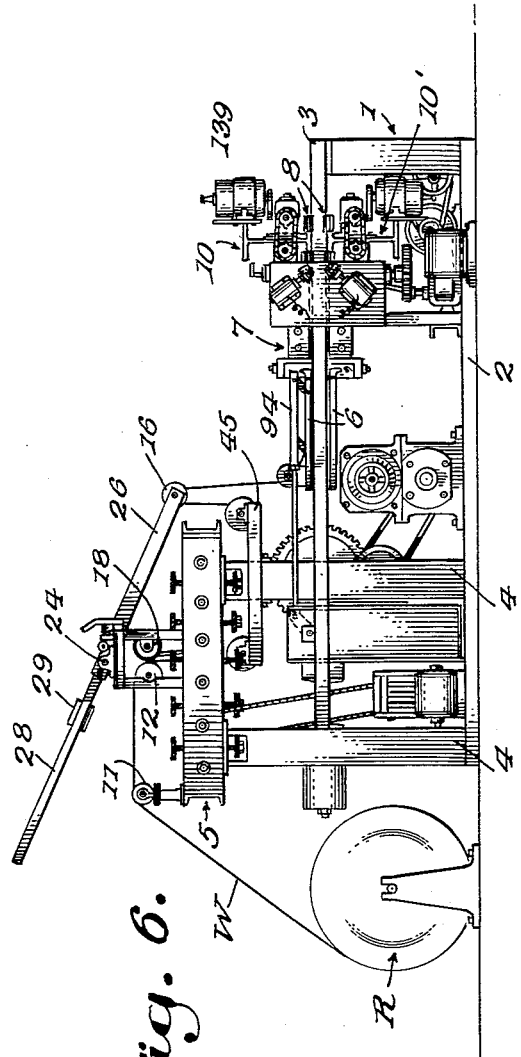
INVENTOR.
John D. Lincoln
BY
ATTY.

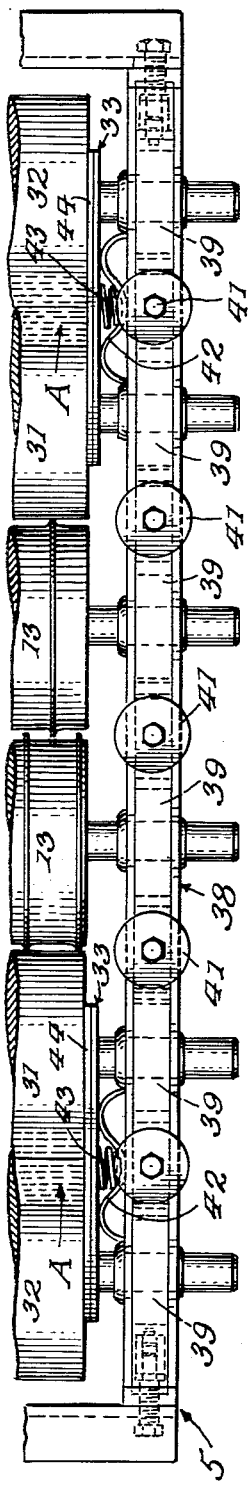
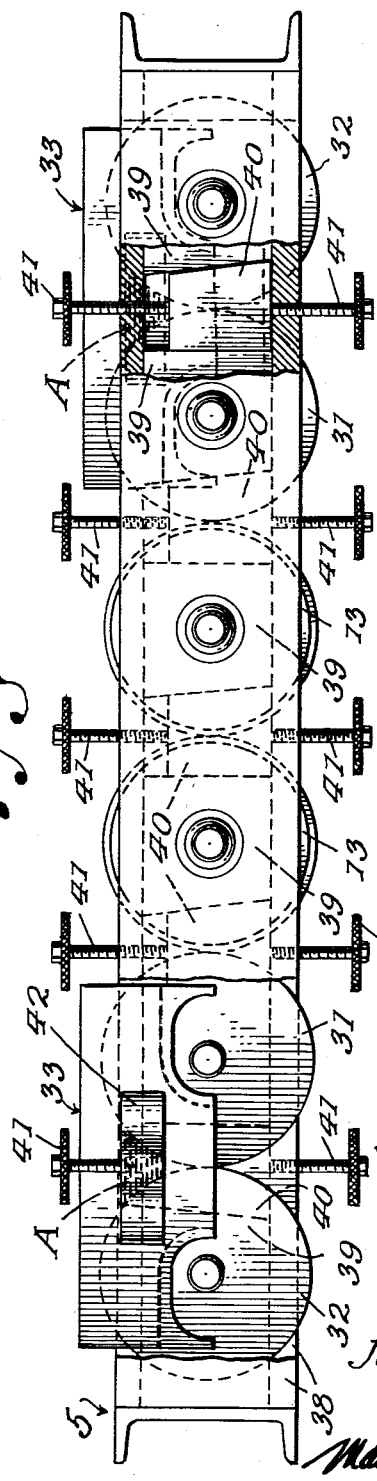
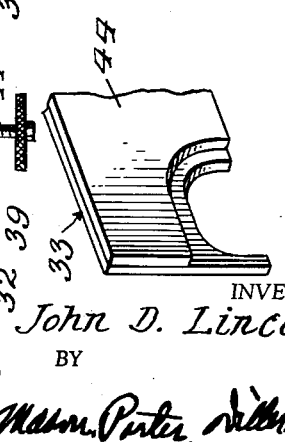
INVENTOR.
John D. Lincoln.
BY
ATTYS.

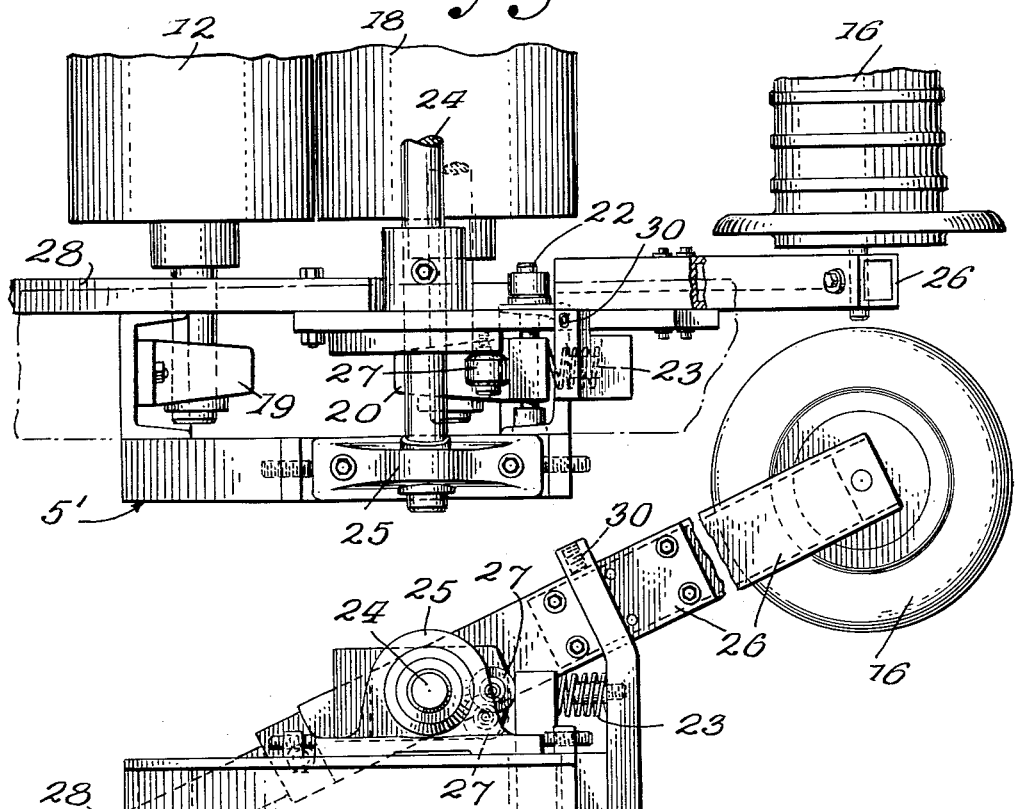
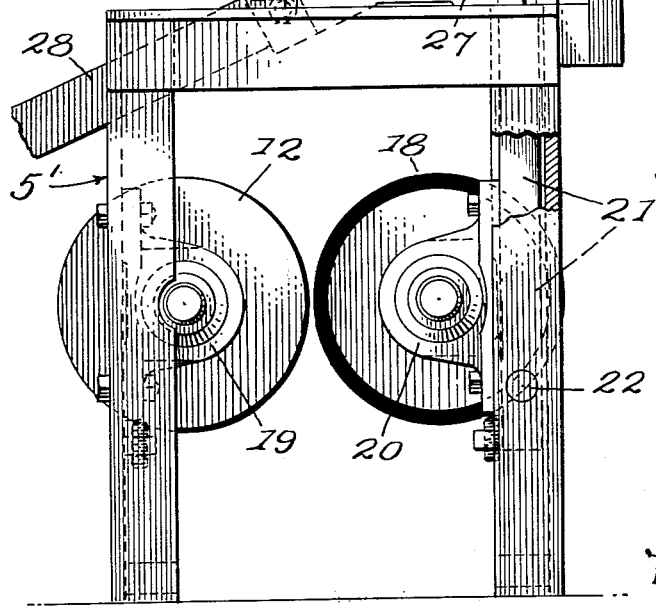

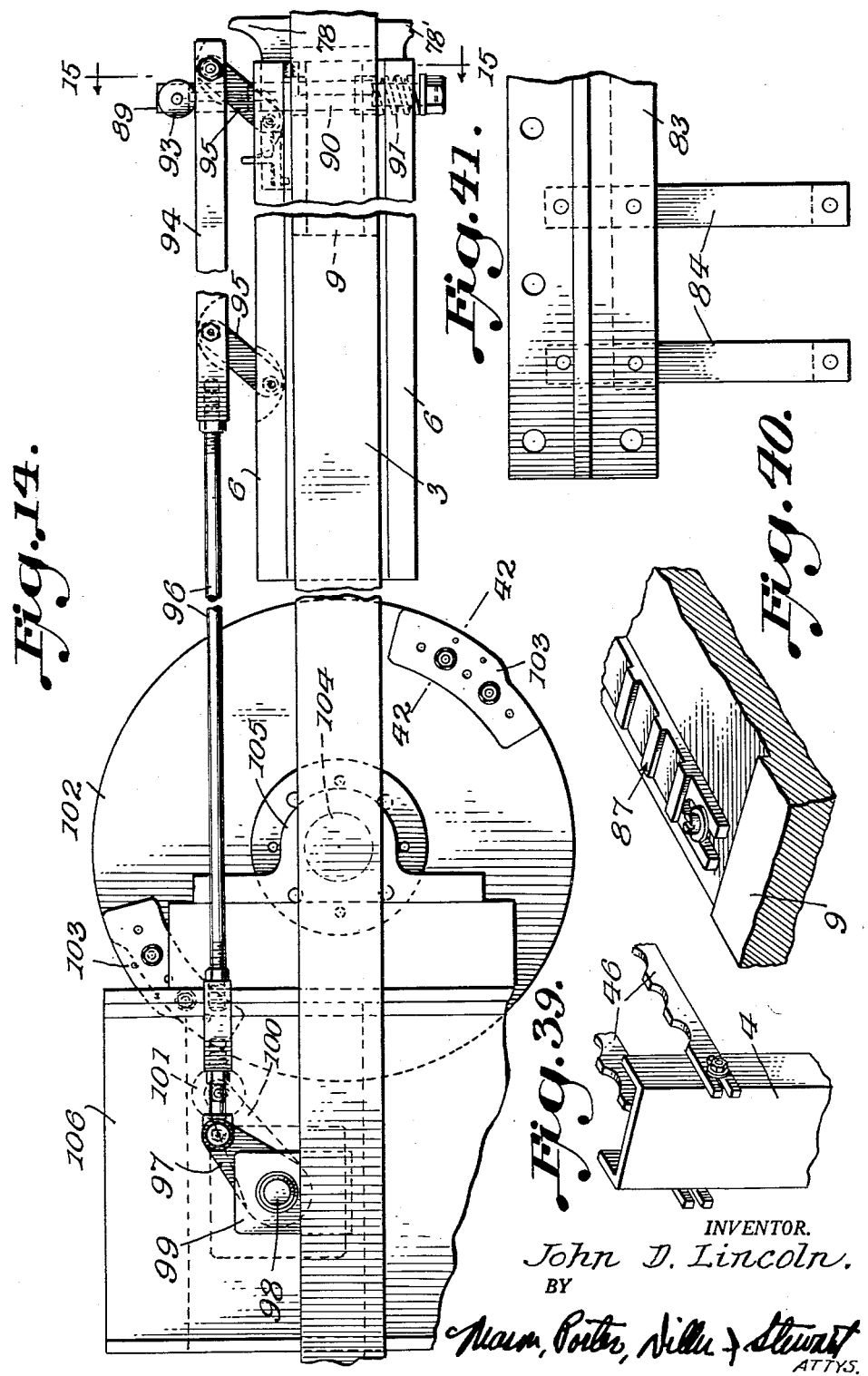

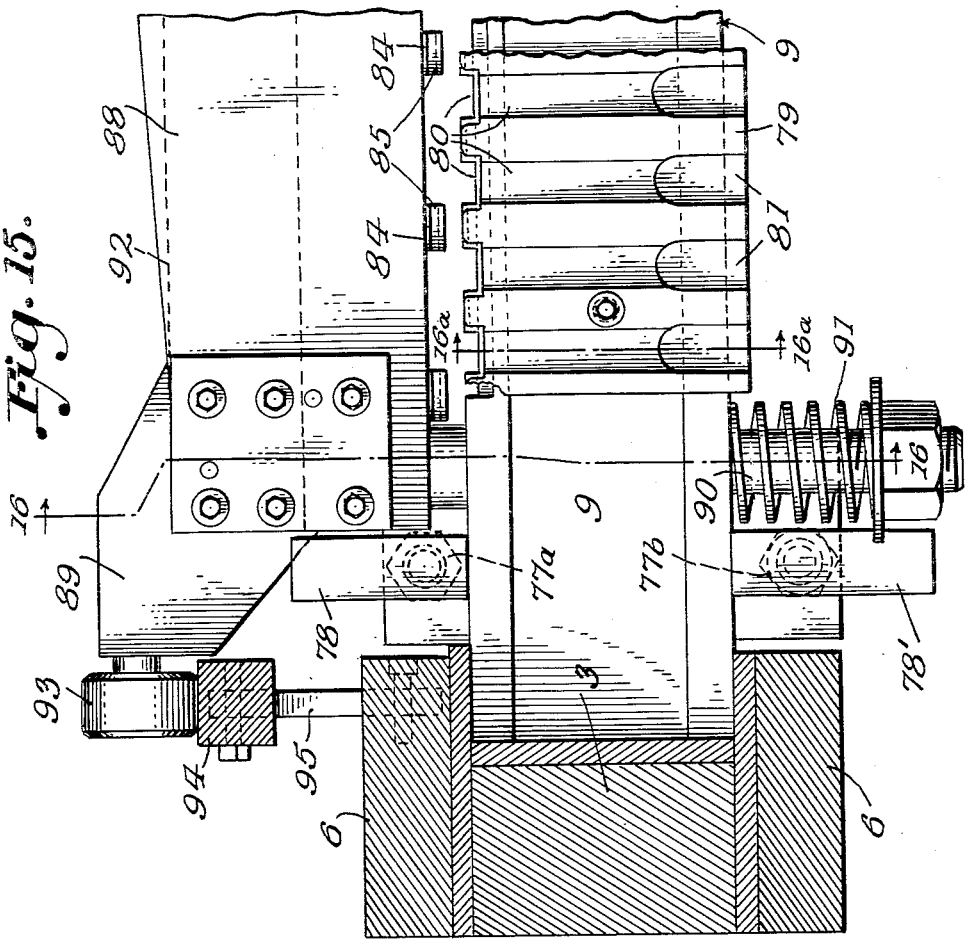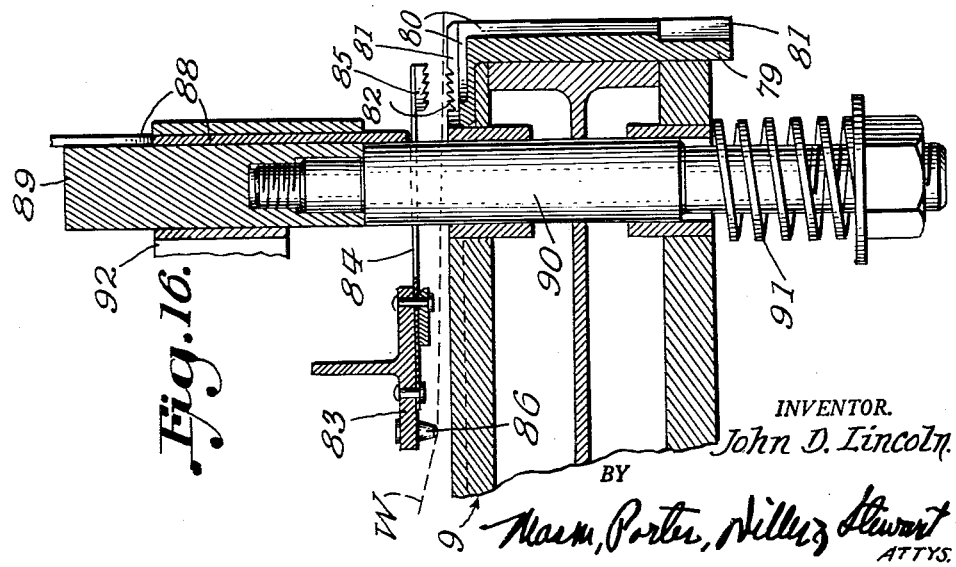

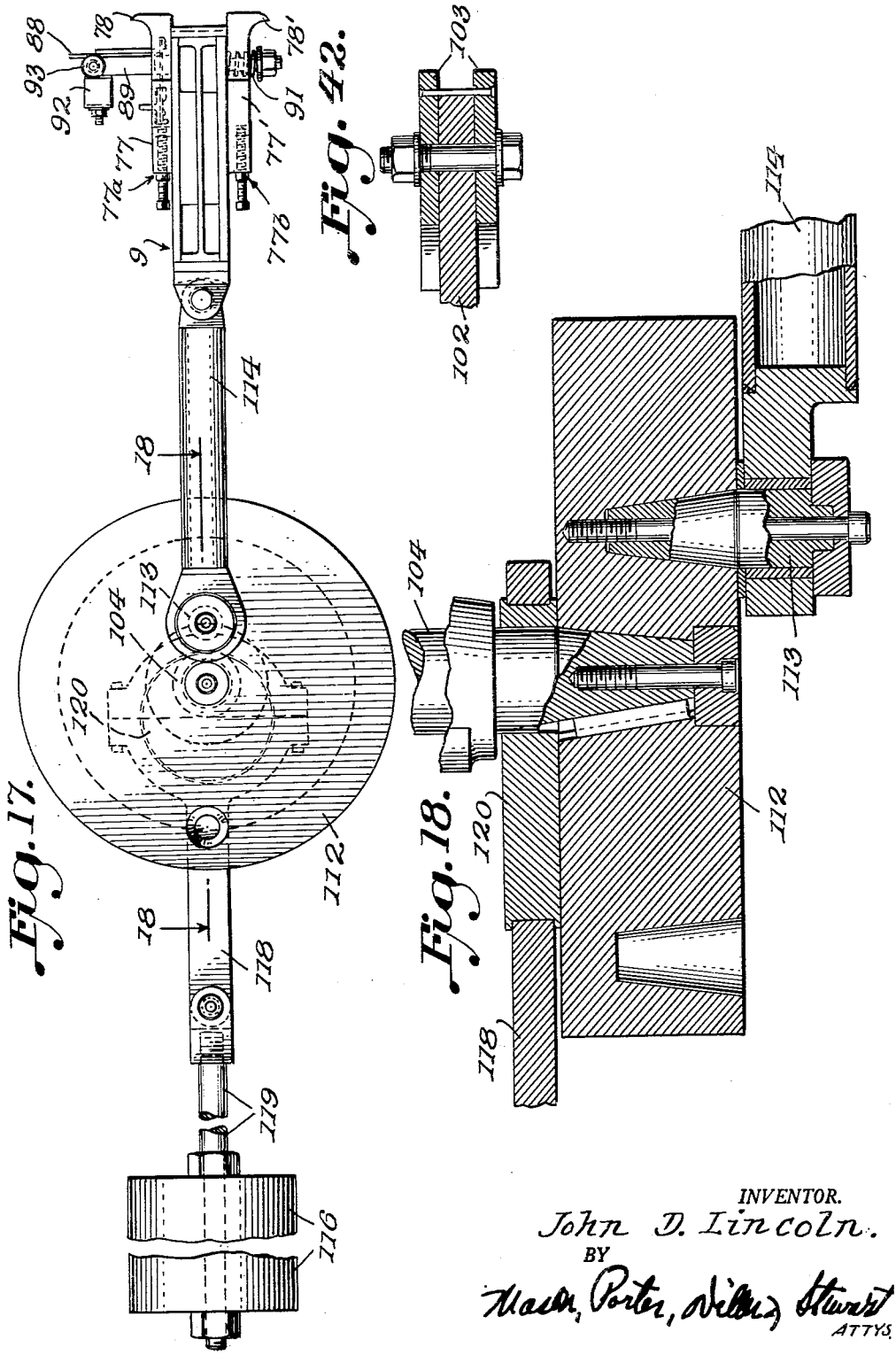

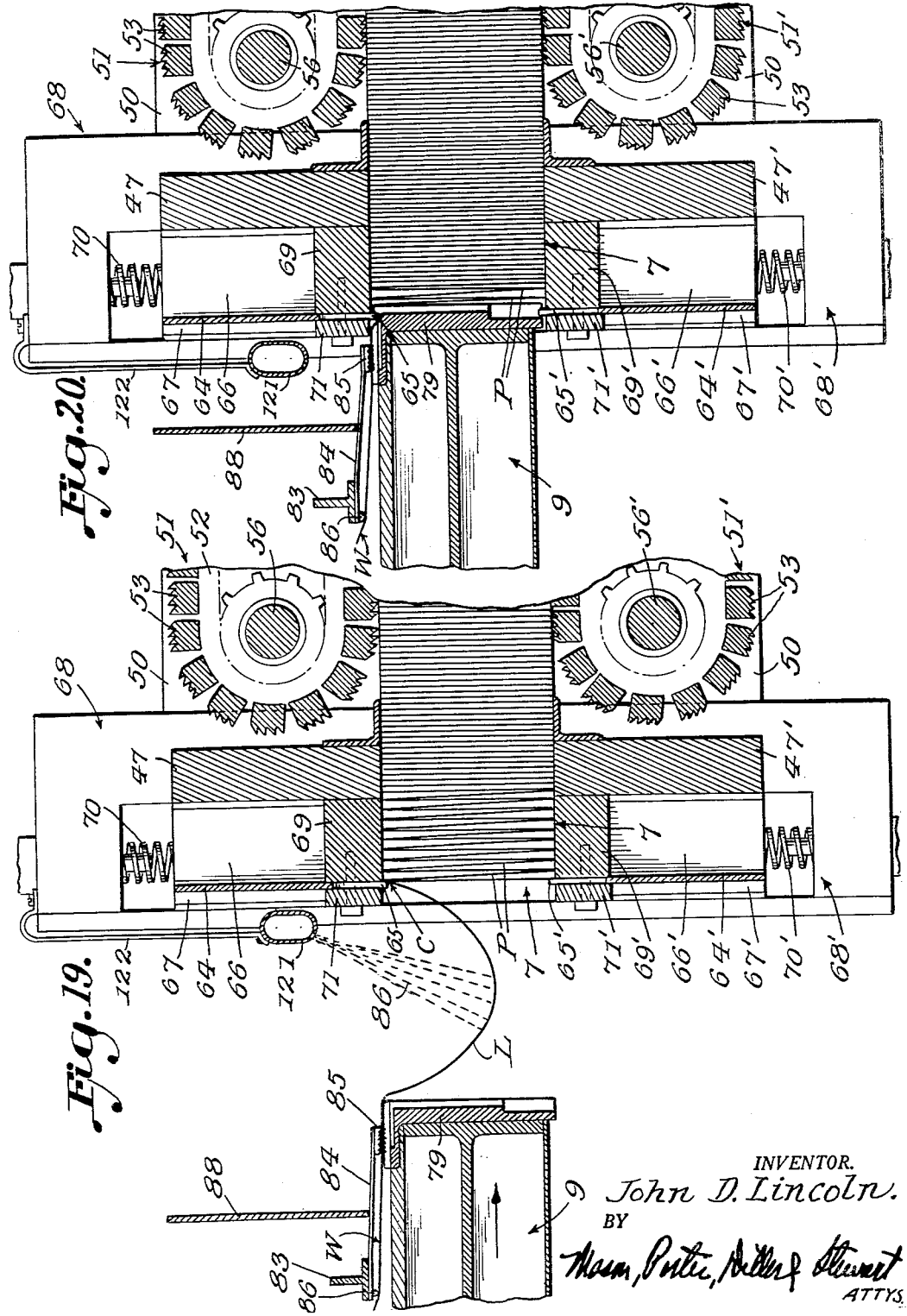

July 25, 1961  J. D. LINCOLN  2,993,525
HONEYCOMB FABRICATING MACHINE
Filed Oct. 28, 1957  16 Sheets-Sheet 12
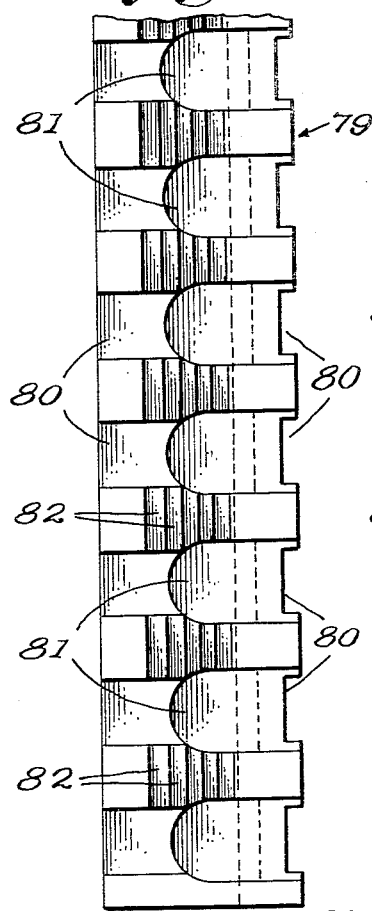
Fig. 21.
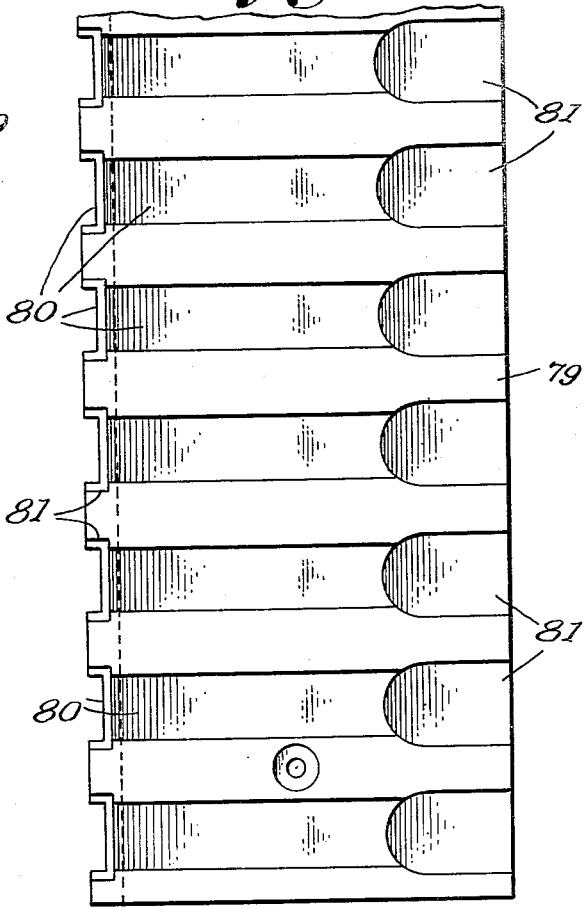
Fig. 22.
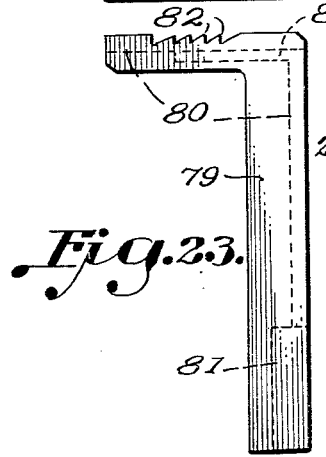
Fig. 23.
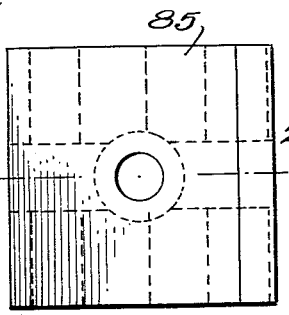
Fig. 25.
Fig. 24
Fig. 26.
INVENTOR.
John D. Lincoln
BY
ATTYS.

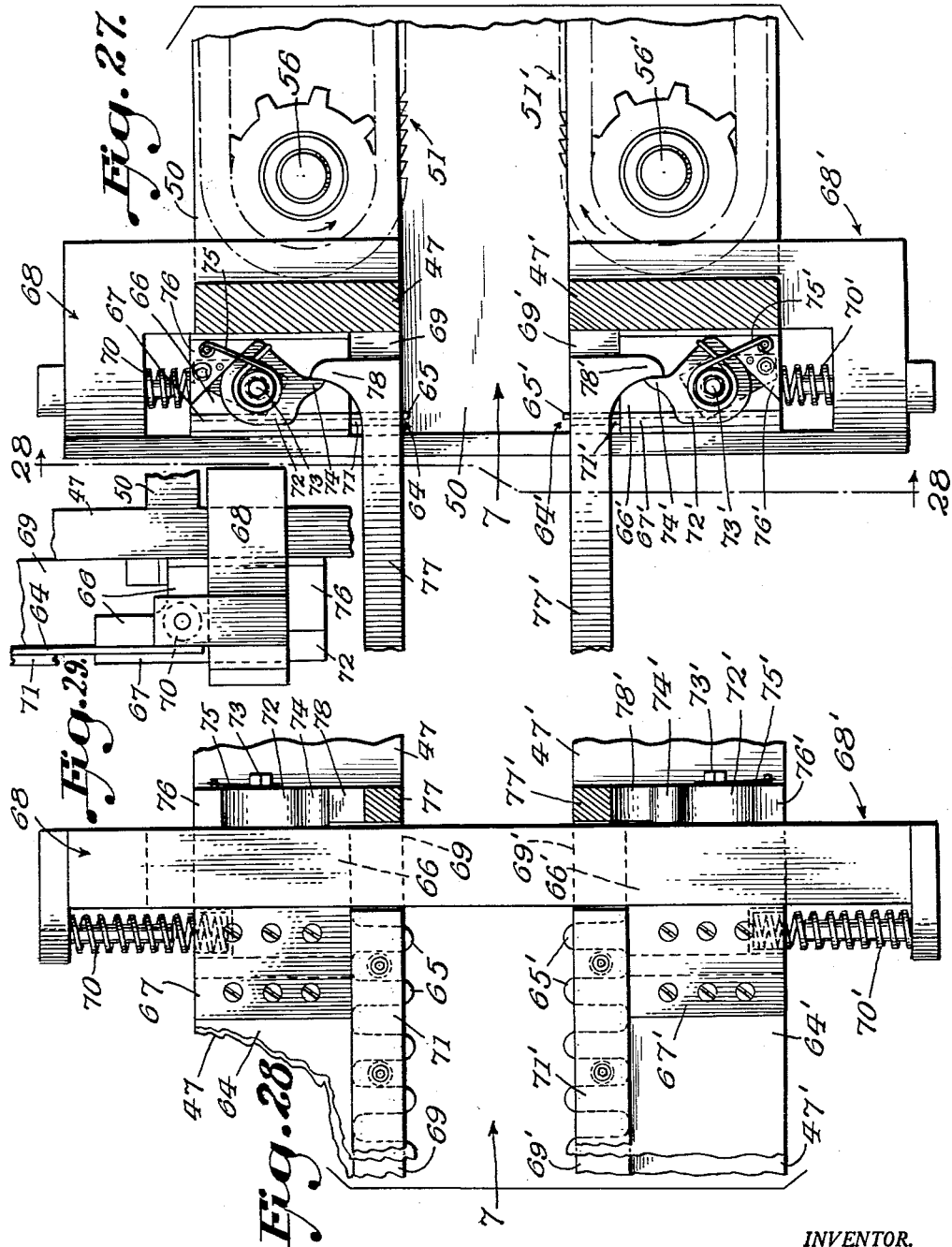

July 25, 1961  J. D. LINCOLN  2,993,525
HONEYCOMB FABRICATING MACHINE
Filed Oct. 28, 1957  16 Sheets-Sheet 14
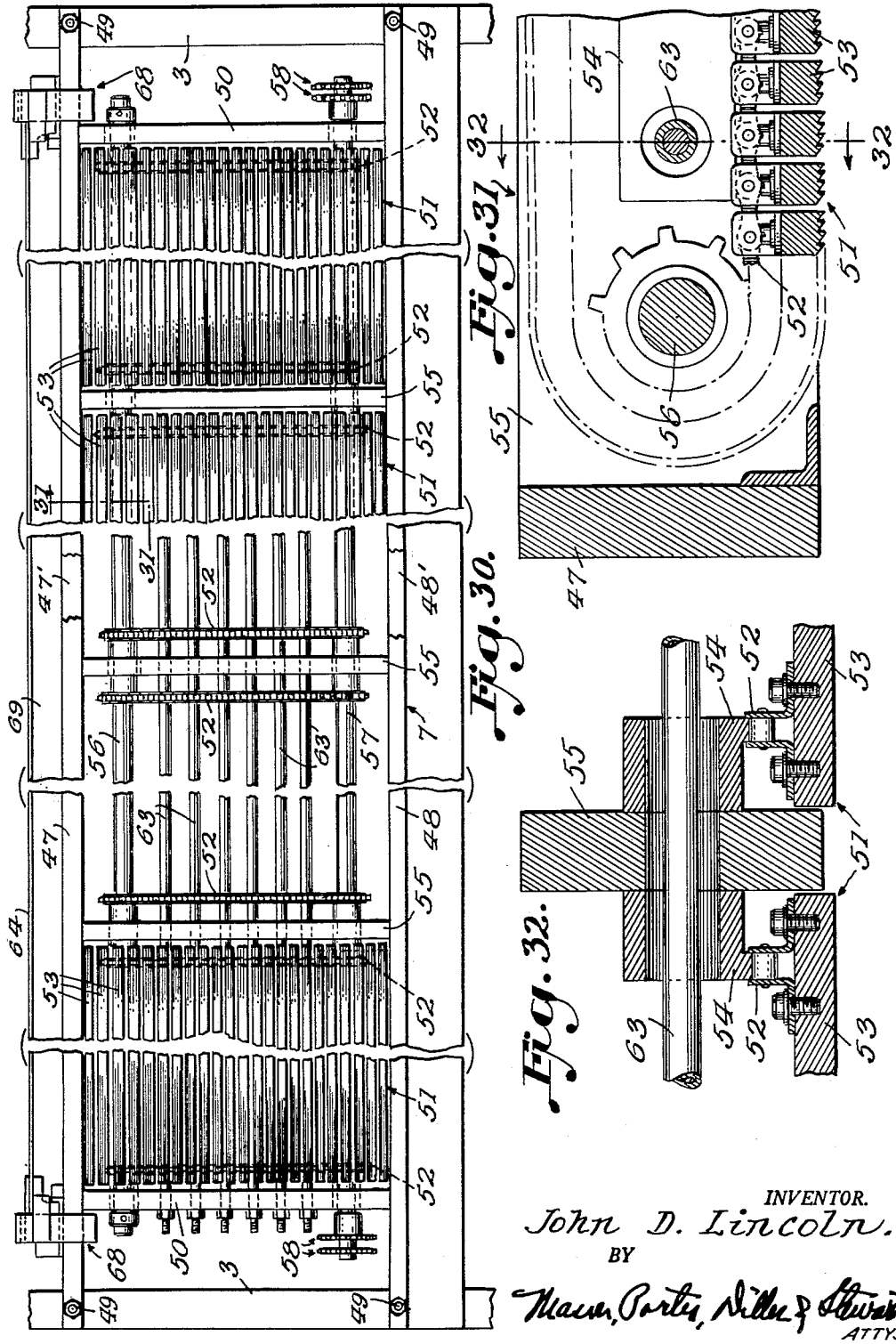
INVENTOR.
John D. Lincoln.
BY
ATTYS.

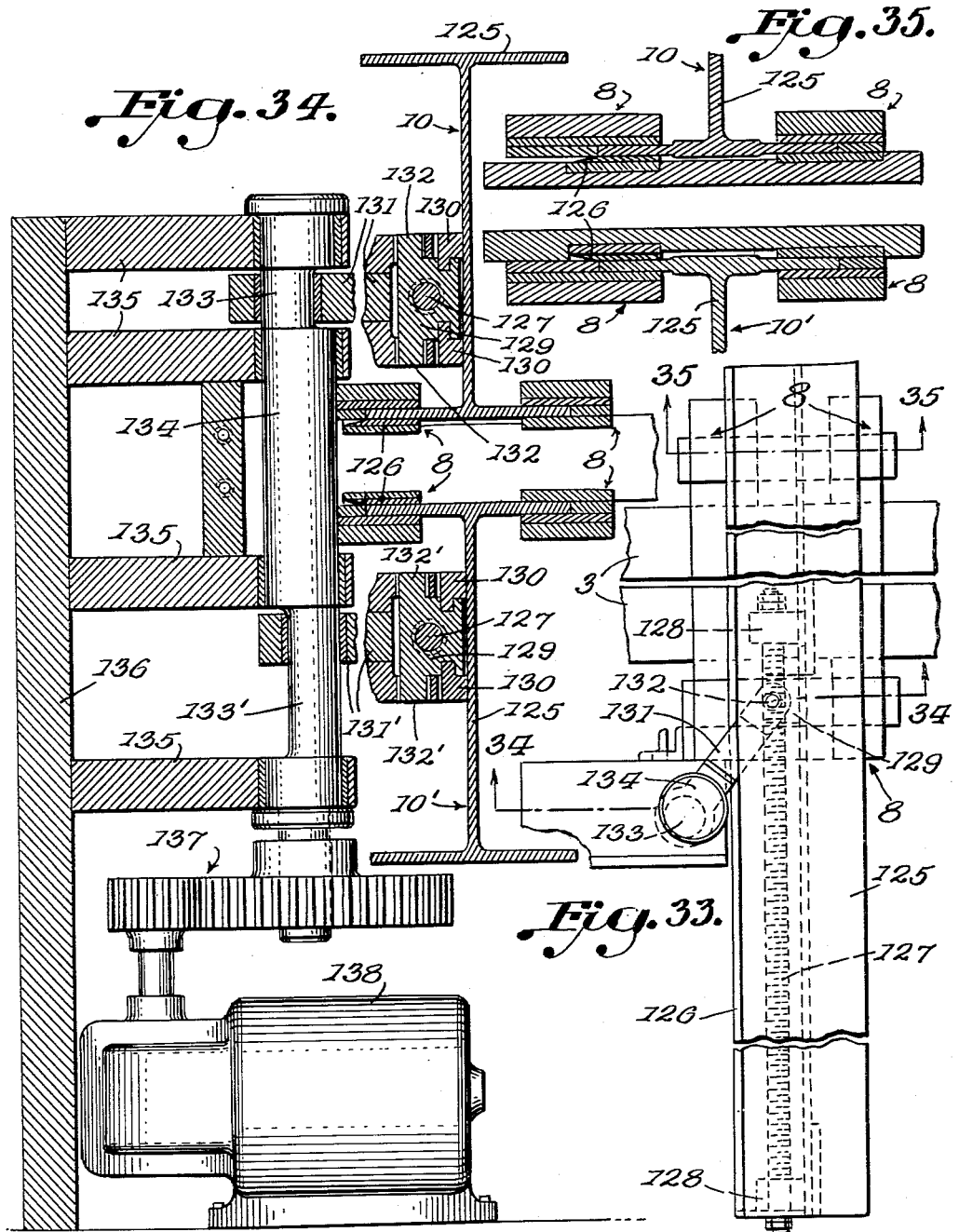

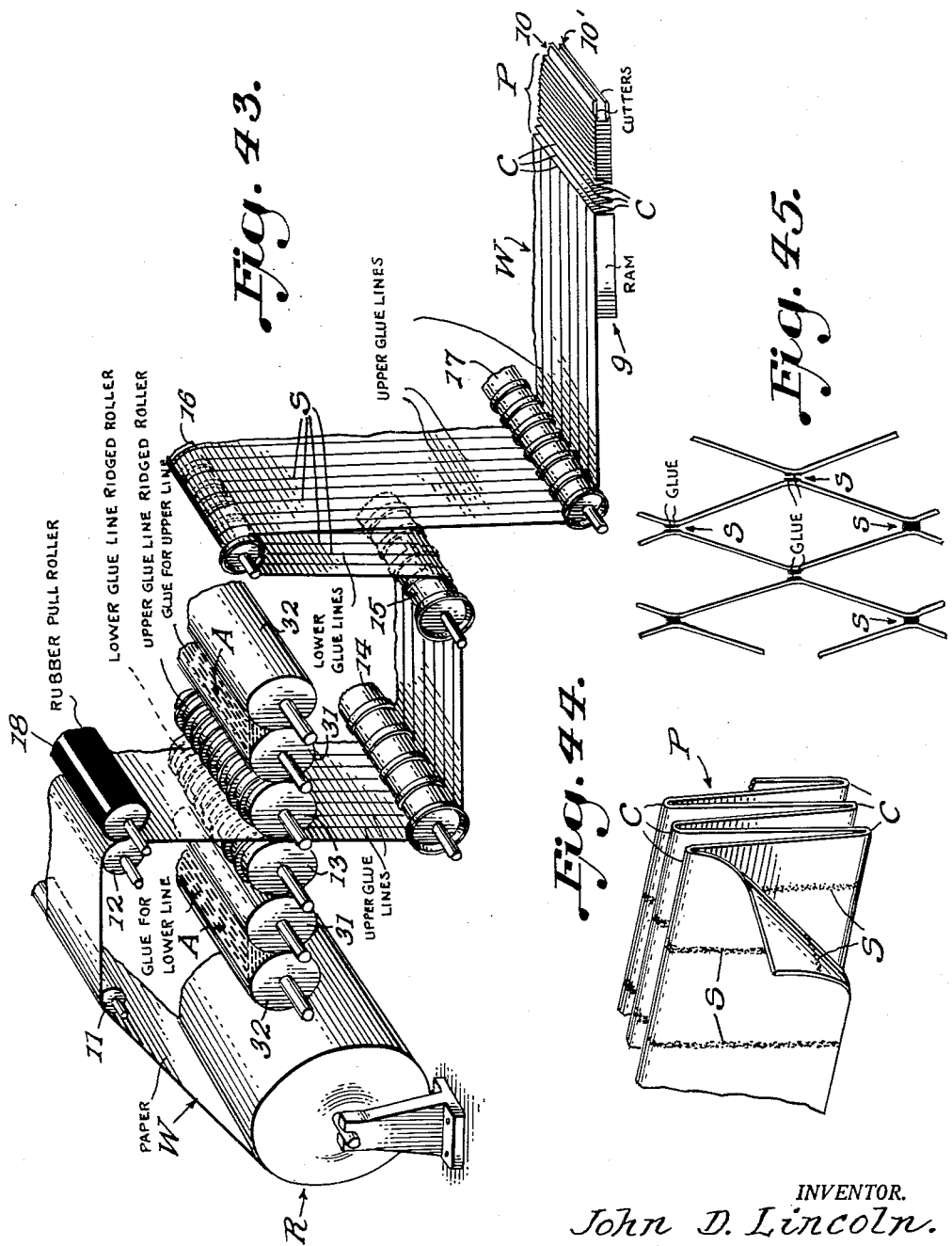

United States Patent Office 2,993,525
Patented July 25, 1961

2,993,525
HONEYCOMB FABRICATING MACHINE
John D. Lincoln, Mount Vernon, Ohio, assignor to Continental Can Company, Inc., New York, N.Y., a corporation of New York
Filed Oct. 28, 1957, Ser. No. 692,793
30 Claims. (Cl. 154—1.8)

This invention relates to machines of the general type disclosed in U.S. Patent 2,553,054, issued May 15, 1951, to J. D. Lincoln et al., and U.S. Patent 2,636,540, issued April 28, 1953, to J. D. Lincoln. Both of these machines are intended for manufacturing a honeycomb structure in ribbon-like form from a flexible travelling web. To accomplish this, longitudinal stripes of adhesive are applied to opposite sides of the web, with the stripes at one side interposed between the stripes at the other side, the striped web is then pleated and the pleat walls secured together by the adhesive stripes, and all bights or crests of the pleats are then cut off, leaving a ribbon-like structure composed entirely of said walls adhesively secured together at intervals. This ribbon-like structure is then longitudinally stretched to separate the unsecured portions of the walls and thus form a honeycomb structure.

Endeavors to construct a really efficient machine in accordance with either of the abovementioned patents, have shown that various improvements are necessary: and the present invention has aimed to supply such improvements.

One object of the invention has been to provide an improved means for pleating the web and forcing each completed pleat directly into an adhesive-drying tunnel.

Another object has been to provide upper and lower endless conveyors at the top and bottom of the drying tunnel in position to engage the upper and lower crests of the pleats and feed the latter through said tunnel, said conveyors being driven sufficiently slowly to allow a ram, forming part of the pleating means, to exert such pressure on the pleats as to insure that the pleat walls shall be tightly secured together by the adhesive stripes.

The above mentioned ram alternately proceeds to and recedes from the entrance of the drying tunnel: and as said ram proceeds, a downward loop is formed in the web between the upper front corner of said ram and the upper crest of the last-formed pleat in the tunnel, said loop being folded into pleat form as the ram advances. Web gripping means are provided on the ram to secure the web to said ram during advance thereof: and upper and lower pleat holders are mounted at the tunnel entrance to retain the last formed pleat in said tunnel until the ram closely approaches the tunnel entrance.

Yet another object has been to provide an improved means for applying the aforesaid web gripping means when the ram is to advance and for releasing said web gripping means when the ram is to return.

Still another object has been to provide means for directing a downward air blast against the aforesaid web loop as the ram advances, and to provide for starting said blast when the web gripping means are activated and for discontinuing said blast when said web-gripping means are released.

A further object has been to make novel provision for releasing the aforesaid pleat holders as the ram closely approaches the tunnel mouth to form the next pleat and for reapplying said pleat holders as soon as this pleat has entered the tunnel.

A further object has been to provide improved means for cutting off the upper and lower crests of the pleats after drying of the adhesive, said means including upper and lower reciprocating knives movable transversely of the path on which the pleated web advances.

A still further object has been to slide one knife in one direction while the other is sliding in the other direction, to thereby overcome transverse machine vibration which would otherwise occur. In this connection, another aim has been to counterbalance the ram to avoid longitudinal machine vibration which would otherwise be caused.

Another object has been to give each knife a length at least twice that actually required, and to make provision whereby one half of each knife may be used until it becomes dulled and whereby the knife may then be shifted to bring its other half into operation.

Yet another object has been to provide novel means for sharpening each dulled knife half during knife shifting.

With the above and other objects in view that will hereinafter appear, the nature of the invention will be more clearly understood by reference to the following detailed description, the appended claims and the several views illustrated in the accompanying drawings.

In the drawings:
FIGURE 1 is an elevation of one side of the machine.
FIGURE 2 is a rear end elevation, parts of the knives being broken away.
FIGURE 3 is a top plan view, partly broken away.
FIGURE 4 is an elevation of the other side of the machine.
FIGURE 5 is a small rear end view showing the full lengths of the two knives.
FIGURE 6 is a small view similar to FIGURE 1 but adding the web supply roll.
FIGURE 7 is a fragmentary top plan view of the adhesive applying means.
FIGURE 8 is a side elevation of FIGURE 7, partly in elevation.
FIGURES 9, 10 and 11 are detail perspective views showing elements of FIGURES 7 and 8.
FIGURE 12 is a fragmentary top plan view of the web feeding means.
FIGURE 13 is a side elevation of FIGURE 12.
FIGURE 14 is a fragmentary side elevation showing the means for applying and releasing the web gripping means of the ram.
FIGURE 15 is an enlarged fragmentary vertical transverse section substantially on line 15—15 of FIGURE 14.
FIGURE 16 is a fragmentary longitudinal section partly on line 16—16 and partly on line 16a—16a of FIGURE 15.
FIGURE 17 is a side elevation showing the ram, the elements mounted thereon, and operating and counterbalancing elements for said ram.
FIGURE 18 is a horizontal section on line 18—18 of FIGURE 17.
FIGURE 19 is an enlarged vertical section showing the ram approaching the drying tunnel and showing the web loop from which the next pleat is being formed.
FIGURE 20 is a similar view with the pleat completed and held in the tunnel.
FIGURE 21 is a fragmentary top view of the member which forms the front end of the ram.
FIGURE 22 is a front elevation of FIGURE 21.
FIGURE 23 is an end view of FIGURE 21.
FIGURES 24 to 26 are detail views of one of the web-engaging jaw blocks forming part of the ram-carried web gripping means.
FIGURE 27 is an enlarged side elevation, partly in section, showing the pleat holders at the tunnel entrance and their opperating means.
FIGURE 28 is a fragmentary vertical transverse section on line 28—28 of FIGURE 27.
FIGURE 29 is a fragmentary top view of elements shown in FIGURES 27 and 28.

FIGURE 30 is an enlarged top view of the drying tunnel structure, parts of the upper conveyors being broken away to disclose the conveyor shafts and the tunnel heaters.

FIGURE 31 is a detail vertical longitudinal section on line 31—31 of FIGURE 30.

FIGURE 32 is a detail transverse section on line 32—32 of FIGURE 31.

FIGURE 33 is a fragmentary top view showing one of the knives, the reciprocating means therefor, and the knife shifting means.

Figure 4:
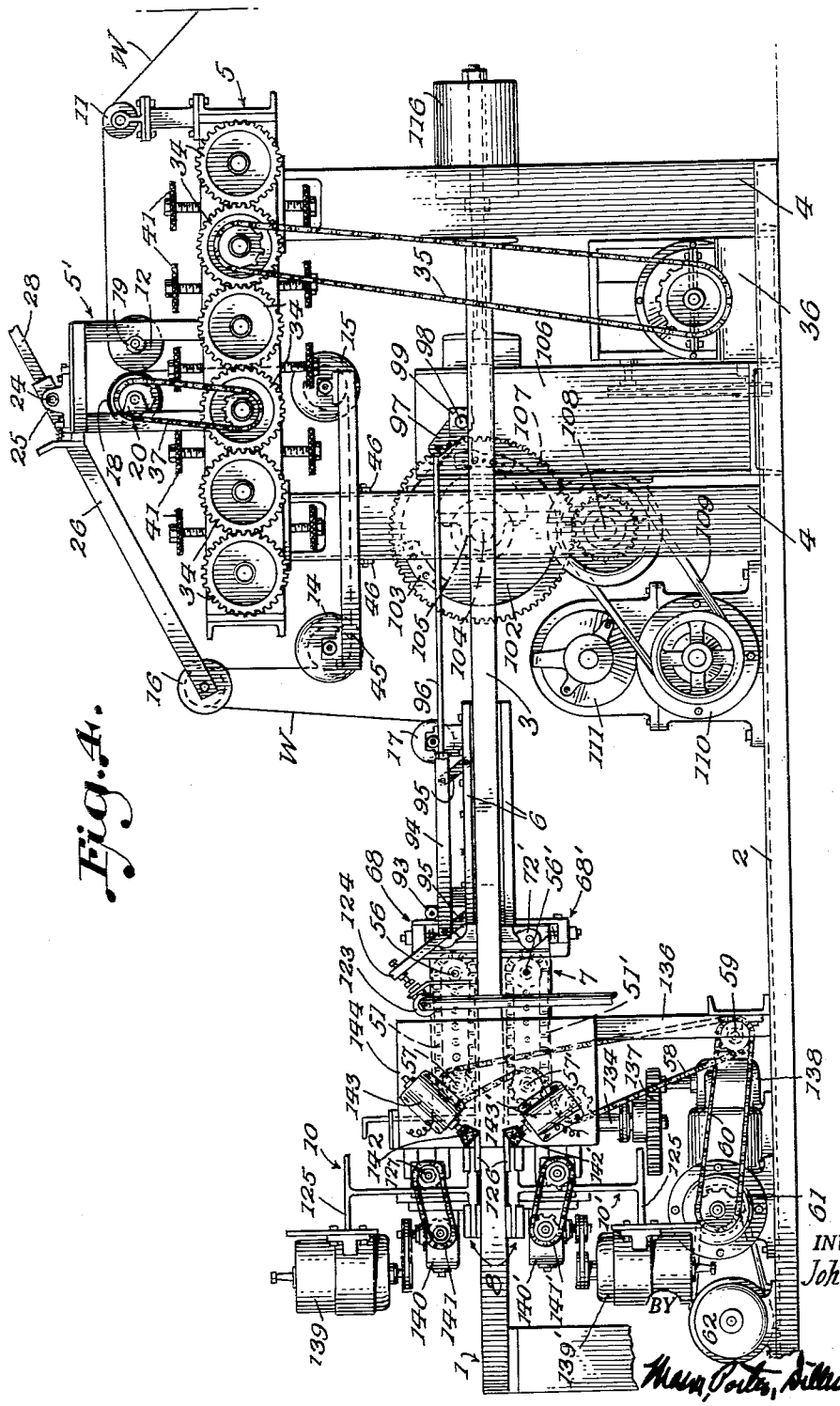

FIGURES 34 and 35 are fragmentary vertical longitudinal sections on lines 34—34 and 35—35 of FIGURE 33.

FIGURE 36 is a diagram showing the two motors for shifting the knives and two of the four motors for driving the knife sharpeners.

FIGURE 37 is a detail view showing two of the motor driven sharpeners engaged with the knife blades.

FIGURE 38 is a similar view showing a non-driven sharpener.

FIGURES 39 and 40 are detail perspectives showing web supporting bars on the machine frame and the ram, respectively.

FIGURE 41 is a fragmentary top view showing two of the web gripping fingers and their carrying bar.

FIGURE 42 is a detail section on line 42—42 of FIGURE 14.

FIGURE 43 is a diagram showing the web travel from supply roll to cutters.

FIGURE 44 is a perspective showing a portion of the pleated web with its pleats somewhat opened.

FIGURE 45 is a diagram showing a portion of the pleated web after cutting off the web crests and longitudinally stretching it into honeycomb form, some of the glue stripes, however, being shown separated.

The illustrated embodiment of the invention will be rather specifically described but attention is invited to the possibility of making variations.

As shown principally in FIGURES 1 to 6, there is a horizontally elongated rigid frame structure 1 which includes a base 2, and parallel longitudinal side bars 3 above said base. At the front end portion of the frame 1, posts 4 rise rigidly from the base 2 and support a horizontal frame 5 in a plane above the side bars 3.

Ram guides 6 are secured to the side bars 3 about midway between the ends of said side bars; an adhesive drying tunnel 7 is mounted on said side bars 3 immediately behind the ram guides 6; and knife guides 8 are mounted on said side bars 3 immediately behind said tunnel. The elevated frame 5 supports means for feeding a web W from a supply roll R (FIGURE 6) and means for applying longitudinal adhesive stripes to opposite sides of said web, with the stripes at one side interposed between the stripes at the other side of said web.

A reciprocatory ram 9 (see FIGURE 3 at present) extends transversely between the frame side bars 3 and has its ends slidably engaged with the ram guides 6 for alternate movements to and from the entrance of the tunnel 7. This ram 9 is instrumental in tightly pleating the striped web W and forcing the successively completed pleats into the adhesive drying tunnel 7 in which the pleat side walls are secured together at intervals by the adhesive.

Upper and lower reciprocatory knives, generally designated 10 and 10', respectively, are mounted in the knife guides 8 at the exit of the tunnel 7, in positions to cut off the upper and lower folded portions of the pleats as they leave the tunnel 7. For convenience, these folded portions will be hereinafter referred to as crests.

Before proceeding to more specific description, reference is invited to FIGURES 43, 44 and 45 (last sheet). The travel of the web is diagrammatically shown in FIGURE 43; the pleats are shown at P and their crests at C in FIGURES 43 and 44; and the adhesive stripes are shown at S. After the adhesive is cured in the tunnel 7, securing the pleat side walls together at intervals, the knives 10 and 10' cut off the crests C. The web is then longitudinally stretched to separate the un-secured portions of the web walls, as diagrammatically shown in FIGURE 45, into honeycomb form, and the honeycomb structure is then rigidified. The means for stretching and rigidifying the honeycomb, however, form no parts of the present invention and are not therefore disclosed.

For illustrative purposes only, some of the pleats P are shown somewhat opened in FIGURE 43, whereas they are all tightly closed as they pass through the tunnel 7. Also, for illustrative purposes only, some of the adhesive stripes S are shown separated in FIGURE 45.

With the understanding given by the above general explanation as to location and function of some of the principal elements of the machine, the following specific description may be better understood.

For the web guiding and feeding means and the means for applying the adhesive stripes S, reference may be made to FIGURES 1 to 4, FIGURES 7 to 13, and FIGURE 43. The web W first passes over a guide roll 11, then over a second guide roll 12. The web then descends between two ribbed adhesive applying rolls 13, then extends under two ribbed guide rolls 14 and 15, and then extends upwardly and over a ribbed dancer roll 16. From this dancer roll, the web extends downwardly and under a ribbed guide roll 17 from which it proceeds over the ram 9. A pull roll 18 coacts with the roll 12 in either pinching the web W or releasing said web, to feed this web as required. The two coacting rolls 12 and 18 are mounted on an upward extension 5' of the frame 5, in the manner best shown in FIGURES 12 and 13. The roll 12 is supported by bearings 19 secured to the frame extension 5': and the pull roll 18 is supported by bearings 20 on two swingable arms. One of these arms is shown at 21, in FIGURES 12 and 13, at one end of the pull roll 18: and the other arm is a duplicate at the other end of said pull roll. The lower end of each arm 21 is pivoted at 22 to the frame extension 5'. The upper end of each arm 21 is biased by a spring 23 in a direction to move the pull roll 18 toward the roll 12.

A rock shaft 24 is mounted in bearings 25 above the pull roll 18 and this shaft is provided with two arms 26 which carry the dancer roll 18. The shaft 24 carries two rollers spaced laterally from the shaft axis for coaction with the upper ends of the arms 21. One of these rollers is shown at 27 in FIGURES 12 and 13. Arms 28 and a weighted arm 29 are secured to the shaft 24 and, by gravity, bias the carrying arms 26 of the dancer roll 16 upwardly to the limit allowed by the stop screw 30. When the arms 26 are permitted to rise to this position by lack of downward pull of the web W on the dancer roll 16, the rollers 27 engage the arms 21 to separate the pull roll 18 from the roll 12 and discontinue feeding of the web W until this web again exerts a downward pull on said dancer roll 16. When this roll is lowered by such pull, the rollers 27 release the arms 21 and allow the springs 23 to swing these arms inwardly, thereby allowing the pull roll 18 to again pinch the web against the roll 12 and cause resumption of web feeding. Downward pull of the web on the dancer roll 16 occurs each time the ram 9 advances to the entrance of the tunnel 7 and is disconnected during each return of said ram from said tunnel.

Two rolls 31 contact, respectively, with the sides of the applicator rolls 13 remote from the web engaging sides of the latter: and two additional rolls 32 contact respectively with the sides of said rolls 31 remote from said rolls 13. Dam plates 33 (see FIGURES 7 and 8) contact with the end surfaces of the rolls 31 and 32 and coact with the upper portions of these rolls in forming two troughs for the adhesive A to be applied to the web W by the applicator rolls 13. All of the rolls 13, 31 and 32 are connected by intermeshing gears 34 (FIGURES 3 and 4) and one of these gears is driven by a chain drive 35 (FIGURES 1 and 4) from a motor driven drive unit 36 on the base 2. One of the rolls is chain-connected at 37 to the pull roll 18 as seen in FIGURES 1, 3 and 4 and all of the rolls 13, 31, 32 and 18 are thus constantly driven. As the upper portions of the rolls 31 and 32 turn away from each other, the rolls 31 supply adhesive to the applicator rolls 13. Any adhesive dripping from the rolls 31 and 32 may be caught in a suitable drip pan (not shown).

As shown in FIGURES 7 and 8, the side members 38 of the elevated frame 5 are hollow and contain bearing blocks 39 for the rolls 13, 31 and 32. These side members 38 also contain wedges 40 for adjusting the rolls as required. Hand screws 41 are provided for adjusting the wedges 40.

The dam plates 33 at the ends of the rolls 31 and 32 are secured to serpentine mounting springs 42 which are also secured to the side bars 38 of the elevated frame 5; and coiled springs 43 aid in holding said dam plates 33 engaged with the ends of said rolls 31 and 32. Each dam plate 33 preferably has a lead face 44 to seal against the roll ends.

The guide rolls 14 and 15 are mounted on bars 45 secured to the posts 4 (FIGURES 1 and 4). Under these bars 45, notched transverse bars 46 (FIGURES 1, 4 and 39) are secured to the posts 4 to support any slack in the web W between the rolls 14 and 15.

The tunnel 7 is best illustrated in FIGURES 19 and 20, 27 and 28, and FIGURES 30 to 32 but elements thereof will also be identified by reference numbers in FIGURES 1, 3 and 4: and reference is now made to these various views.

Two upper transverse bars 47 and 48 extend across the frame 1 and are secured at 49 upon the side bars 3. Two lower bars 47' and 48' extend across the frame 1 under the bars 47 and 48, respectively, and are secured against the lower sides of the side bars 3. The two bars 47 and 47' are at the entrance end of the tunnel 7 and the bars 48 and 48' at the exit end thereof. Parallel, longitudinal, vertical plates 50 extend from the bars 47 and 47' to the bars 48 and 48' and are secured to all of these bars. These plates 50 are near the frame side bars 3 and they form opposed side walls for the tunnel 7. The top of this tunnel 7 is formed by the lower flights of an upper series of endless conveyors 51: and the bottom of said tunnel is formed by the upper flights of a similar but lower series of endless conveyors 51'. All of the upper conveyors 51 are shown in FIGURE 3 and some of them are disclosed in FIGURE 30. The illustration of the lower conveyors 51' is fragmentary but they are substantial duplicates of the upper conveyors 51.

Each conveyor 51 and 51' is composed of sprocket chains 52 and toothed bars 53 extending between and secured to said chains. Suitable guide tracks 54 (FIGURES 31 and 32) are provided to prevent flutter of the lower flights of the upper conveyors and the upper flights of the lower conveyors, to insure that the tunnel top and bottom formed by said flights shall remain in parallel relation. The guide tracks 54 are secured to supporting bars 55 and the side plates 50.

The sprocket shafts for the upper conveyors 51 are shown at 56 and 57 and those for the lower conveyors at 56' and 57'. Both ends of the two shafts 57 and 57' are driven by sprocket-and-chain-drives 58 (FIGURES 1, 2 and 4) from a transverse drive shaft 59 mounted over the base 2. The shaft 59 is chain and sprocket connected at 60 to a speed reduction unit 61 which is belt-connected to an electric motor 62.

Electric heaters 63 (FIGURES 30 to 32) are suitably mounted between the upper and lower flights of the conveyors 51 and 51' to thoroughly cure the contacting adhesive stripes S on the walls of the pleats P as these pleats are fed through the tunnel 7, thereby preparing said pleats for cutting off of their crests C.

It will be recalled that the ram 9 is instrumental in forming the pleats P and forcing them into the tunnel 7. It is necessary to provide means for holding the pleats P against any tendency to move retrogradely out of the tunnel entrance as the ram recedes from this entrance: and upper and lower pleat-holding finger plates 64 and 64' have been provided for this purpose, as seen in FIGURES 19, 20, 27, 28 and 29. The fingers 65 and 65' of the two finger plates project slightly into the tunnel entrance while a pleat is being formed (FIGURE 19), are withdrawn as the ram 9 forces the completed pleat into the tunnel, and are then again projected (FIGURE 20) to hold the pleats while the ram 9 withdraws.

The ends of the upper finger plate 64 are secured to two blocks 66 by means of screw-held clamping plates 67: and the ends of the lower finger plate 64' are similarly secured at 67' to two blocks 66'. Two upper guides 68 slidably mount the upper blocks 66 for vertical movements: and two lower guides 68' similarly mount the lower blocks 66'. The upper guides 68 are secured to the ends of the upper transverse bar 47 above described: and the lower guides 68' are secured to the ends of the above described lower bar 47'.

Additional upper and lower bars 68 and 69' extend longitudinally of and are secured to the bars 47 and 47', respectively. These bars 69 and 69' extend respectively into the lower ends of the upper guides 68 and the upper ends of the lower guides 68', in positions to limit the descent of the upper blocks 66 and the ascent of the lower blocks 66', respectively. Upper springs 70 bias the upper blocks 66 and the upper finger plate 64 downwardly to the limit allowed by the bar 69: and lower springs 70' bias the lower blocks 66' and the lower finger plate 64' upwardly to the limit allowed by the bar 69'.

The fingers 65 and 65' lie respectively against the bars 69 and 69', and are guided by these bars 69 and 69' and by guide bars 71 and 71' secured to said bars 69 and 69', respectively.

Means are provided for raising the upper flange plate 64 and lowering the lower finger plate 64' as the ram 9 closely approaches the entrance of the tunnel 7 and for returning said finger plates when the ram reaches said entrance. These means are shown in FIGURES 27 and 28 primarily, but elements thereof are identified by reference numbers in FIGURES 1, 3 and 4.

On each of the upper slide blocks 66, a pawl 72 is pivoted at 73. This pawl is provided with a downwardly projecting nose 74: and a spring 75 biases said pawl to a position against a stop block 76, from which position said pawl can turn only in the direction which moves the nose 74 away from the bar 47.

Two longitudinal cam-carrying shanks 77 are adjustably secured at 77a (FIGURE 17) upon the ram 9 and project somewhat forwardly therefrom for coaction with the two pawls 72, respectively. The front end of each shank 77 is provided with an upstanding finger-like cam 78. As the ram 9 very closely approaches the entrance of the tunnel and is about to force a newly formed pleat into said entrance, the two cams 78 force upwardly on the two pawl noses 74 respectively, thereby raising the upper blocks 66 and the upper finger plate 64 out of the way of the pleat. As soon as the ram 9 fully reaches the tunnel entrance and forces the newly completed pleat into the same, the cams 78 pass the pawl noses 74 and the springs 70 downwardly return the blocks 66 and finger plate 64 to hold the upper crest of the newly formed pleat in the tunnel entrance. The ram 9 then returns and during this movement, the cams 78 turn the pawls 72 idly against the action of their springs 75 and allow said cams 78 to pass the noses 74. The springs 75 then return the pawls 72 to their normal positions against the stop blocks 76.

A lower pawl 72' having a nose 74' is pivoted at 73' to each lower slide block 66' and is biased against a stop block 76' by a spring 75'. A lower shank 77' having a cam 78' is adjustably secured at 77b to the ram 9. The two cams 78' and pawls 72' coact in the same manner as the upper cams 78 and pawls 72, except that they lower the lower finger plate 64' as the ram 9 very closely approaches the entrance of the tunnel 7 and allow said finger plate to again move upwardly as soon as the ram 9 has forced the newly completed pleat into said entrance.

The front end of the ram 9 is formed from an angle plate 79 shown in FIGURES 15 and 16 and in FIGURES 19 to 23. The face and top of this angle plate are grooved at 80 to clear the adhesive stripes on the web, and are further recessed at 81 to receive the ends of the fingers 65 and 65' of the finger plates 64 and 64'. Between the upper grooves, the angle plate has teeth 82.

A transverse T-bar 83 is secured on and spaced upwardly from the ram 9 as seen in FIGURES 3, 16, 19 and 20. This bar carries spring fingers 84 having toothed terminal blocks 85 one of which is shown in detail in FIGURES 24 to 26. These terminal blocks 85 coact with the teeth 82 of the ram angle plate 79 in gripping the web W and thus connecting said web to the ram 9 as this ram proceeds toward the entrance of the tunnel 7 (see FIGURE 19). During this proceeding movement of the ram 9, the web turns down about the upper front corner of the angle plate 79 and a downward air blast 86 (FIGURE 19) coacts with the ram movement in forming a loop L from the portion of the web between the ram and the upper crest C of the last formed loop. As the ram continues, it folds this loop to form the next pleat which is admitted into the tunnel by withdrawal of the finger plates 64 and 64'. Each admitted pleat is forced tightly against the adjacent pleat by the ram; and the conveyors 51 and 51' which form the tunnel top and bottom, travel sufficiently slowly to cause all pleats in the tunnel to remain tightly closed, insuring that the adhesive stripes S shall tightly secure the pleat walls together at intervals. In this connection, attention is directed to the fact that some of the pleats P are shown in abnormal somewhat opened condition in FIGURES 19 and 20.

The web W extends from the final roll 17 between the T-bar 83 and the ram 9; and said bar 83 is provided with studs 86 to contact with the portions of the web W between the upper adhesive stripes. Also, in case the web should sag, the ram 9 preferably carries a notched bar 87 (FIGURES 3 and 40), to receive the web and engage the portions thereof between the lower adhesive stripes.

The spring fingers 84 are biased by their own resiliency to raised positions in which their terminal blocks 85 are spaced above the ram to clear the web W. However, a transverse plate 88 (FIGURES 3, 15, 16, 19 and 20) is provided over said fingers, to depress them to operative position when the ram 9 proceeds toward the tunnel 7, and to release said fingers as said ram returns. The ends of the plate 88 are secured to blocks 89 having vertical shanks 90 extending slidably through the ram 9 as seen in FIGURES 14, 15 and 16. Springs 91 on these shanks bias the blocks 89 and plate 88 toward lowered position. The plate 88 is longitudinally stiffened by a suitable truss structure 92. The blocks 89 have rollers 93 which rest on longitudinal tracks 94 (FIGURES 1, 3, 4, 14 and 15) disposed over the uppermost of the ram guides 6. Each of the tracks 94 is supported by inclined pivoted links 95. Two longitudinal rods 96 (FIGURES 1, 4 and 14) are secured to and extend from one end of the tracks 9 in a direction away from the tunnel 7. These rods 96 are pivoted respectively to two inclined arms 97 on opposite ends of a transverse rock shaft 98 which is mounted in bearings 99 on the frame side bars 3. Between its ends, the rock shaft has an operating arm 100 provided with a roller 101 (FIGURE 14). A rotary cam 102 (FIGURES 4 and 14) coacts with the roller 101 to allow turning of the rock shaft 98 in a direction to cause lowering of the tracks 92 while the ram 9 proceeds, thereby allowing the springs 91 to lower the plate 88 and depress the fingers 84 to operative position. The cam 102 also coacts with the roller 101 to turn the rock shaft 98 in a direction to raise the tracks 92 while the ram returns, thus raising the plate 88 and allowing upward return of the fingers 84 to released position. The dwell of the cam 102 preferably has adjustable terminals 103 as seen in FIGURES 14 and 42.

The cam 102 is secured on a short transverse shaft 104 (FIGURES 1, 3, 4 and 14) which is mounted in bearings 105 secured to two rigid posts 106 rising from the base 2. The shaft 104 is driven by gearing 107 from a subjacent shaft 108 which is belt-connected at 109 to a speed adjusting drive unit 110 which is driven by an electric motor 111.

The shaft 104 is also an operating shaft for the ram 9. It is provided with two disks 112 (FIGURES 3, 17 and 18) each having a crank pin 113. The two crank pins 113 are connected with the ram 9 by piston rods 114 to reciprocate said ram. The shaft 108 preferably has a flywheel 115 (FIGURES 2 and 3).

To counteract the longitudinal machine vibration which would otherwise be caused by reciprocation of the ram 9, two counterbalancing weights 116 (FIGURES 3 and 17) are mounted at 117 to slide longitudinally of the machine. Connecting rods 118 are connected to the carrying shanks 119 of the weights 116, and eccentrics 120 (FIGURES 17 and 18) are engaged with said connecting rods 118. When the crank pins 113 move the ram 9 in one direction, the eccentrics 120 move the weights 116 in the other direction and vice versa, thereby preventing said ram from longitudinally vibrating the machine.

It was hereinbefore stated that an air blast 86 (FIGURE 19) aided in forming the web loop L into a pleat upon proceeding movement of the ram 9 toward the tunnel 7. This blast is discharged from a perforated pipe 121 (FIGURES 3, 18 and 19) suspended by hangers 122 from the guides 68. The pipe 122 has a self-closing compressed air admission valve 123 (FIGURES 3 and 4); and one of the links 95 has an extension 124 which opens said valve when the tracks 94 and lowered (ram advancing) and allows said valve to close when said tracks 94 are again raised and the ram is to return.

For the construction of and the operating means for the reciprocatory knives 10 and 10', reference is made to FIGURES 1 to 4, 33 and 34. Each knife consists of an I-beam 125 slidable in the guides 8, and a longitudinal blade 126 secured to said I-beam, the two blades 126 being in position to cut off the upper and lower crests C of the pleats P as they leave the tunnel 7.

Each I-beam 125 carries a longitudinal screw 127 rotatably mounted in bearings 128 (FIGURE 33). Each screw 127 is threaded through a nut 129 which slidably engages guide tracks 130 (FIGURE 34) secured to the I-beam 125 and extending longitudinally thereof. An upper pitman 131 (FIGURES 33 and 34) is pivoted at 132 to the nut 129 of the uppermost of the I-beams 125; and a lower pitman 131' is pivoted at 132' to the nut 129 of the lowermost of said I-beams. The upper pitman 131 engages a crank pin 133 on a vertical crank shaft 134; and the lower pitman 131' engages a crank pin 133' on said crank shaft. This shaft 134 is mounted in suitable bearings 135 secured to a rigid post 136 which rises from the base 2; and said shaft is gear-connected at 137 with an electric motor 138. Driving of the crank shaft 134 thus reciprocates the upper and lower knives 10 and 10' to cause them to effectively cut off the pleat crests C. The crank pins 133 and 133' are spaced 180° apart, and, therefore, as either knife is moved in one direction, the other knife is moved in the opposite direction. Excessive transverse vibration of the machine is thus avoided.

Each knife 10, 10' is at least twice as long as actually needed to cut off the crests C. Thus, half the length of each knife may be used until it has become dulled (see FIGURE 5) and each knife may then be shifted to bring its other half into operation. This shifting of the knives is accomplished by driving the two screws 127, causing them to thread through the nuts 129.

Two electric motors 139 and 139' (FIGURES 1, 2 and 4) are secured to the I-beams 127 of the two knives 10 and 10' respectively, for driving the two screws 127. The motors 139 and 139' are belt-connected to reduction units 140 and 140' and these units are chain-connected at 141 and 141' with the upper and lower screws 127, respectively.

Provision is made for sharpening each dulled half of each knife during longitudinal shifting of the two knives by means of the screws 127 and in describing the sharpening means, attention is directed more particularly to FIGURES 1 to 4 and to FIGURE 37.

Two upper grinding wheels 142 are provided, at opposite sides of the machine, to serve the blade 126 of the upper knife 10; and two lower grinding wheels 142' are provided for the blade 126 of the lower knife 10'. The grinding wheels 142 are secured to the shafts of upper motors 143 and the wheels 142' are secured to the shafts of lower motors 143'. All of the motors 143 and 143' are mounted on fixed supporting plates 144. The motor mounting means is such that all of the motors may normally occupy positions in which the grinding wheels do not touch the knife blades, to avoid unnecessary grinding away of these blades as they reciprocate, the motors, however, being shiftable to bring the grinding wheels into contact with the knife blades when the two knives 10 and 10' are to be longitudinally shifted after half of each blade has become dulled. For illustrative purposes, bolt and slot connections 145 have been indicated in FIGURE 37 to allow the required shifting of the motors 143 and 143'.

By the arrangement of grinding wheels shown, the dulled half of each knife blade may be given one grinding operation as the knife is shifted from one position to its other position and may be given a second grinding operation when the knife is later shifted from said other position back to said one position. The blades may thus be kept very sharp to effectively perform their duties.

In FIGURE 36, an illustrative wiring diagram for the knife shifting motors 139 and 139' and the grinding wheel motors 143 and 143' is shown, one of the motors 143' being omitted from the view. Only the motors 139 and 139' need be of reversible type.

In FIGURE 38, an example of a non-driven grinding stone is shown at 146. Such stones could if desired be used instead of the driven grinding wheels 142 and 142'.

*Operation*

During operation of the machine, the rolls 13, 31, 32 and 18 are constantly driven; the ram 9 is constantly reciprocated; the endless conveyors 51 are constantly driven; and the knives 10 and 10' are constantly reciprocated. The pull roll 18 pulls the web W from the supply roll R as needed, and the rolls 13 apply the adhesive stripes S. From the final roll 17, the striped web extends between the spring fingers 84 and the ram 9 and on to the upper crest of the last-formed pleat in the tunnel 7. This last-formed pleat and those adjacent thereto are held against movement out of the tunnel entrance by the fingers 65 and 65' of the finger plates 64 and 64' whenever the ram 9 is spaced from said tunnel entrance. Whenever the ram 9 is at the position in which it is most widely spaced from the tunnel entrance, a length of the web, equal to twice the height of a pleat P, extends from said ram to the upper crest of the last-formed pleat in the tunnel 7. As the ram starts toward the tunnel, the fingers 84 are lowered and thus connect the web to the ram and the air valve 123 is opened. As the ram proceeds (see FIGURE 19) the abovementioned length of web turns down around the upper front corner of the ram 9 and the air blast 86 coacts with the ram movement in forming the next pleat. As the ram very closely approaches the entrance of the tunnel 7, the finger plates 64 and 64' are moved to withdraw their fingers 65 and 65', allowing the ram 9 to force the newly formed pleat into the tunnel mouth and exert pressure against the pleats in the tunnel. In this connection, it should again be observed that, for illustration, some of the pleats in the tunnel have been shown in FIGURES 19, 20 and 43 in abnormal somewhat opened positions. As soon as the newly formed pleat enters the tunnel, the finger plates 64 and 65 are operated to restore their fingers 65 and 65' to pleat-holding positions. The conveyors 51 and 51' operate at a sufficiently slow speed to allow the ram 9 to exert such pressure on the pleats as to tightly close them, insuring that the adhesive stripes S shall secure the pleat walls together at staggered intervals, the adhesive being cured by the heat supplied by the heaters 63. When the ram 9 has completed its pleat-forming function, the finger hold-down plate 88 is lifted and the blast controlling valve 123 allowed to close. The ram 9 then returns with the fingers 84 free from the web W and the next cycle starts.

As the tight pleats P leave the tunnel 7, the reciprocating knives 10 and 10' cut off the upper and lower crests C, leaving the pleat walls secured together at staggered intervals, in readiness for stretching the web into honeycomb form and rigidifying the same.

It will be recalled that only one half of each of the knives 10 and 10' operates on the pleat crests C (see FIGURE 5). When this half becomes dulled, the knives are shifted to bring the other half of each knife into operation, and during knife shifting the dulled edges are re-sharpened by the grinding wheels 142 and 142', or by the stones 146.

It will be seen from the foregoing that novel and advantageous provision has been disclosed for attaining the desired ends. However, attention is again invited to the possibility of making variations.

I claim:

1. In a machine for the manufacture of a honeycomb structure from a foldable web having longitudinal adhesive stripes on its opposite sides and having the stripes at one side interposed between the stripes at the other side; an elongated adhesive-drying tunnel to receive a tightly pleated length of the striped web with the crests of the pleats disposed alternately upwardly and downwardly, said tunnel including upper and lower endless conveyors to engage the pleat crests and feed the tightly pleated web through said tunnel, a ram disposed in alignment with said tunnel and recessed to clear the adhesive stripes on the web, web gripping means on said ram and positioned to so hold the striped web that it may downwardly turn around the upper front corner of the ram as said ram advances, means for reciprocating said ram to alternately advance its front end to the entrance of the pleat-containing tunnel and then return said ram a distance equal to twice the height of the web pleats, means for applying said web-gripping means during each advance of said ram and for releasing said web-gripping means during each return of said ram, upper and lower pleat holders movably mounted at said entrance of said tunnel in position to prevent return movement of the pleats from said tunnel, means for depressing the striped web into loop form between the upper crest of the last-formed pleat and the upper front corner of the ram as the latter advances, pleat holder operating means for releasing said pleat holders as said ram closely approaches said tunnel and folds the depressed web portion into pleat form and for reapplying said pleat holders before said ram recedes from said tunnel, and means for driving the aforesaid endless conveyors to feed the tightly pleated web through said tunnel at a sufficiently slow speed to insure that said ram shall exert pressure on the pleats and insuring that the pleat side walls shall be secured together by the adhesive stripes in readiness for cutting off of the pleat crests and completing the honeycomb structure.

2. A structure as specified in claim 1: said means for depressing the striped web into loop form comprising means for directing a downward blast of air against the web loop between the ram and the tunnel entrance, and means for actuating said air blast means when said web gripping means is applied.

3. A structure as specified in claim 1, in which an upper and a lower reciprocating knife are mounted at the exit of said tunnel for movement transversely of the pleated web and in positions to cut off the upper and lower crests of the pleats leaving said tunnel.

4. A machine for making a honeycomb structure, said machine having a tunnel to receive a tightly pleated portion of a web, and web pleating means including a ram movable to and from the tunnel entrance; a transverse bar fixedly mounted on said ram over the web path, upwardly biased web-engaging fingers mounted on said bar and depressible to secure the web to said ram as the latter moves toward said tunnel, a transverse downwardly biased finger-depressing element over said fingers, said finger-depressing element having rollers at its ends, longitudinal tracks upon which said rollers rest, means mounting said tracks for upward and downward movements and means for lowering said tracks as said ram moves toward said tunnel and for raising said tracks as said ram recedes from said tunnel.

5. A machine for making a honeycomb structure, said machine having a tunnel to receive a tightly pleated portion of a web, and web pleating means including a ram movable to and from the tunnel entrance; a transverse bar fixedly mounted on said ram over the web path, upwardly biased web-engaging fingers mounted on said bar and depressible to secure the web to said ram as the latter moves toward said tunnel, a transverse downwardly biased finger-depressing element over said fingers, said finger-depressing element having rollers at its ends, longitudinal tracks upon which said rollers rest, inclined pivoted links upon which said tracks are mounted to cause said tracks to lower when longitudinally moved in one direction and rise when moved in the other direction, and means connected to said tracks for moving them in said one direction as said ram moves toward said tunnel and for moving them in said other direction as said ram recedes from said tunnel.

6. A structure as specified in claim 4 in which said web pleating means includes means for directing an air blast against the web between said ram and said tunnel, and means for actuating said blast directing means when said tracks are lowered and for discontinuing actuation thereof when said tracks are raised.

7. A structure as specified in claim 5 in which said web pleating means includes means for directing an air blast against the web loop between said ram and said tunnel, said blast directing means having a self-closing valve, one of the aforesaid inclined links being provided with an extension operatively associated with said valve to open the same when said links swing in track-lowering direction.

8. A machine for making a honeycomb structure, said machine having a tunnel to receive a tightly pleated portion of a web, and web pleating means including a ram movable to and from the entrance of said tunnel; upper and lower pleat holders elongated transversely of said tunnel and disposed at the entrance of said tunnel to prevent the pleats from leaving the tunnel through said entrance, means mounting said pleat holders for vertical movements, means biasing the upper pleat holder to an effective lowered position, means biasing the lower pleat holder to an effective raised position, and coacting means on said pleat holders and ram for raising the upper pleat holder and lowering the lower pleat holder as said ram closely approaches the tunnel entrance and for releasing both of said pleat holders when said ram has reached said tunnel entrance with said coacting means having no effect on said pleat holders as said ram recedes from said tunnel entrance.

9. A machine for making a honeycomb structure, said machine having tunnel to receive a tightly pleated portion of a web, and web pleating means including a ram movable to and from the entrance of said tunnel; upper and lower pleat holders elongated transversely of said tunnel and disposed at the entrance of said tunnel to prevent the pleats from leaving the tunnel through said entrance, means mounting said pleat holders for vertical movements, means biasing the upper pleat holder to an effective lowered position, means biasing the lower pleat holder to an effective raised position, and coacting means on said pleat holders and ram for raising the upper pleat holder and lowering the lower pleat holder as said ram closely approaches the tunnel entrance and for releasing both of said pleat holders when said ram has reached said tunnel entrance, said coacting means including elements which idly move with no effect on said pleat holders as said ram recedes from said tunnel entrance.

10. A machine for making a honeycomb structure, said machine having a tunnel to receive a tightly pleated portion of a web, and web pleating means including a ram movable to and from the entrance of said tunnel; upper and lower pleat holders elongated transversely of said tunnel and disposed at the entrance of said tunnel to prevent the pleats from leaving the tunnel through said entrance, means mounting said pleat holders for vertical movements, means biasing the upper pleat holder to an effective lowered position, means biasing the lower pleat holder to an effective raised position, pawls pivotally mounted on the ends of said pleat holders and having cam engaging noses, cams on said ram to engage said noses and lift the upper pleat holder and lower the lower pleat holder when said ram closely approaches the entrance of said tunnel, and spring means biasing said pawls to fixed positions in which said cams can thrust against said noses, said cams being constructed to pass said noses and allow return of said pleat holders to effective positions when said ram has reached said tunnel entrance, said pawls being idly swingable by said cams as said ram recedes from said tunnel entrance.

11. In a machine for the manufacture of a honeycomb structure from a foldable web having longitudinal adhesive stripes on its opposite sides and having the stripes at one side interposed between the stripes at the other side; a frame structure, means mounted on said frame structure for longitudinally feeding the web, tightly pleating said web and disposing the crests of the pleats upwardly and downwardly, an upper knife disposed transversely of the pleated web path in position to cut off the upper crests of the pleats, a lower knife disposed transversely of the pleated web path in position to cut off the lower crests of the pleats, means mounting said knives on said frame structure for sliding in the direction of their lengths, and knife reciprocating means connected with said knives.

12. A structure as specified in claim 11, in which said knife reciprocating means is constructed to slide one of said knives in one direction while the other of said knives is being slid in the other direction, thereby preventing said knives from excessively vibrating the machine.

13. A structure as specified in claim 11: each of said knives being of at least twice the length actually required, thereby permitting half the length of each knife to be used until dulled and then permitting use of the other half, said knife reciprocating means including means allowing shifting of each knife to position said other half thereof for operation after said one-half has become dulled.

14. A structure as specified in claim 11: each of said knives being of at least twice the length actually required, thereby permitting half the length of each knife to be used until dulled and then permitting use of the other half, said knife reciprocating means including means for shifting each knife to position said other half thereof for operation after said one-half has become dulled, and means connected with said knife shifting means for operating the same.

15. A structure as specified in claim 11: each of said knives being of at least twice the length actually required, thereby permitting half the length of each knife to be used until dulled and then permitting use of the other half, said knife reciprocating means including means for shifting each knife to position said other half thereof for operation after said one-half has become dulled, and switch-controlled electric motors connected with said knife shifting means for operating the same.

16. A structure as specified in claim 11, in which said knife operating means comprises a screw mounted on and extending longitudinally of each knife, a nut on each screw, a pitman connected to each nut, and crank means for reciprocating each pitman; each of said knives being at least twice the length actually required, thereby permitting half the length of each knife to be used until dulled and then permitting use of the other half, shifting of said knives to bring either half thereof into operative position being attainable by rotation of said screws.

17. A structure as specified in claim 11: each of said knives being of at least twice the length actually required, thereby permitting half the length of each knife to be used until dulled and then permitting use of the other half, said knife reciprocating means including means allowing shifting of each knife to position said other half thereof for operation after said one-half has become dulled, and knife sharpening means mounted in position to re-sharpen the dulled half of each knife during knife shifting.

18. A structure as specified in claim 11: each of said knives being of at least twice the length actually required, thereby permitting half the length of each knife to be used until dulled and then permitting use of the other half, said knife reciprocating means including means allowing shifting of each knife to position said other half thereof for operation after said one-half has become dulled, and motor-driven knife sharpening means mounted in position to resharpen the dulled half of each knife during knife shifting.

19. A honeycomb making machine having a ram mounted for reciprocation; ram counterbalancing means also mounted for reciprocation, and driven operating means connected with said ram and said counterbalancing means, said operating means being constructed to simultaneously slide said ram and counterbalancing means in opposite directions, thereby avoiding excessive machine vibration.

20. A structure as specified in claim 19 in which said operating means comprises a driven shaft having crank pins pitman-connected to said ram, said shaft also having eccentrics pitman-connected to said counterbalancing means.

21. Apparatus as defined in claim 9 wherein the ram has recesses extending through the tunnel opposing face thereof and placed to clear the pleat holders and permit travel of said ram face beyond the plane in which said holders operate, thereby to assure the pressing of each last formed pleat into the tunnel where it can be engaged and held by said holders prior to retraction of the ram.

22. Apparatus as defined in claim 9 wherein the pleat holders are in the form of fingers reciprocable in a vertical plane paralleling the ram face opposed to the tunnel, said ram face having recesses therein and extending through the top and bottom faces of the ram and placed so that the fingers can project therein with said ram face against the last formed pleat in the tunnel entrance.

23. Apparatus as defined in claim 9 wherein the ram has recesses extending through the tunnel opposing face thereof and placed to clear the pleat holders and permit travel of said ram face beyond the plane in which said holders operate, thereby to assure the pressing of each last formed pleat into the tunnel where it can be engaged and held by said holders prior to retraction of the ram, said tunnel being defined at top and bottom by endless conveyors disposed to confine and impart movement to the tightly pleated portion of the web.

24. Apparatus as defined in claim 9 wherein the pleat holders are in the form of fingers reciprocable in a vertical plane paralleling the ram face opposed to the tunnel, said ram face having recesses therein and extending through the top and bottom faces of the ram and placed so that the fingers can project therein with said ram face against the last formed pleat in the tunnel entrance, said tunnel being defined at top and bottom by endless conveyors disposed to confine and impart movement to the tightly pleated portion of the web.

25. In apparatus as defined in claim 1 wherein are included means for applying the adhesive striping to the web, means for directing the web to the gripping means on the ram and including idler rolls and separable web gripping and feeding rolls, dancer roll means controlled as to position by the amount of slack in the web between the feeding rolls and said gripping means, and means controlled by the position of the dancer roll means to separate the feeding rolls when slack in the web indicates a lack of need for additional feeding of the web.

26. In apparatus as defined in claim 1 wherein are included means for applying the adhesive striping to the web, means for directing the web to the gripping means on the ram and including idler rolls and separable web gripping and feeding rolls, dancer roll means controlled as to position by the amount of slack in the web between the feeding rolls and said gripping means, and means controlled by the position of the dancer roll means to separate the feeding rolls when slack in the web indicates a lack of need for additional feeding of the web, said feeding rolls being in opposed relation, one fixed and one supported on swingable arms, said dancer roll means being supported on a counterpoised arm, and said arm having thereon cam means engageable with one of the arms to determine the position of the feeding roll supported thereon.

27. In a machine for the manufacture of a honeycomb structure from a foldable web and wherein adhesive is applied to the web and the web is folded to form tight pleats; a tunnel for holding the web in its tightly pleated state until the adhesive sets, said tunnel comprising a pair of spaced parallel side plates for engaging edges of a tightly pleated web portion, and upper and lower endless conveyors disposed between said side plates, said upper and lower endless conveyors having opposed spaced parallel runs for engaging the pleated web portion and feeding the pleated web portion between said side plates, said conveyors each including a pair of spaced endless members and closely spaced bars extending between said endless members, fixed tracks for said less members adjacent said conveyor runs for maintaining said bars in fixed planes during movement of said bars along said parallel runs.

28. Apparatus as defined in claim 27 wherein said bars have serrated pleated web portion engaging faces, the serrations of said bars extending transversely of the direction of travel of said bars whereby gripping of the pleated portion of the web by said upper and lower conveyors is assured.

29. Apparatus as defined in claim 27 wherein said endless members are in the form of interconnected links, certain of said links having a pair of guide plates disposed remote from said bars, said guide plates being disposed on opposite sides of a respective one of said tracks.

30. Apparatus as defined in claim 27 wherein heating elements are provided for setting the adhesive as the pleated portion of the web passes between said conveyors, said heating elements being disposed within the general confines of said upper and lower conveyors.

References Cited in the file of this patent

UNITED STATES PATENTS

| | | |
|---|---|---|
| 1,802,880 | Cumfer | Apr. 28, 1931 |
| 1,863,912 | Robertson et al. | June 21, 1932 |
| 1,864,478 | Ward | June 21, 1932 |
| 1,924,472 | Thompson | Aug. 29, 1933 |
| 1,935,519 | Quinn | Nov. 14, 1933 |
| 2,257,738 | Fischer | Oct. 7, 1941 |
| 2,318,497 | Kassel | May 4, 1943 |
| 2,556,032 | Faeber | June 5, 1951 |
| 2,581,421 | Lombard et al. | Jan. 8, 1952 |
| 2,631,643 | Schueler | Mar. 17, 1953 |
| 2,636,540 | Lincoln | Apr. 28, 1953 |
| 2,648,371 | Goodwin et al. | Aug. 11, 1953 |
| 2,670,026 | Ungar | Feb. 23, 1954 |